Oct. 18, 1932.  J. R. EVERHART  1,883,658
SHEARS SHARPENER
Filed April 18, 1931
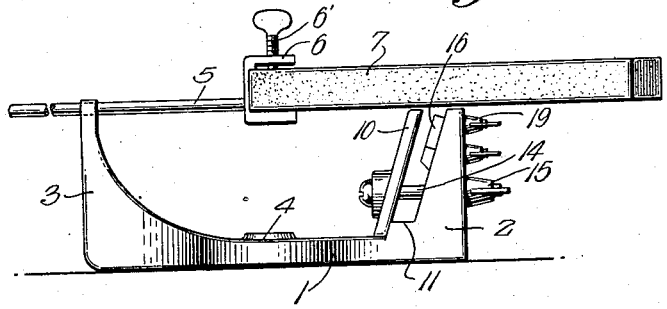
Fig. 1.
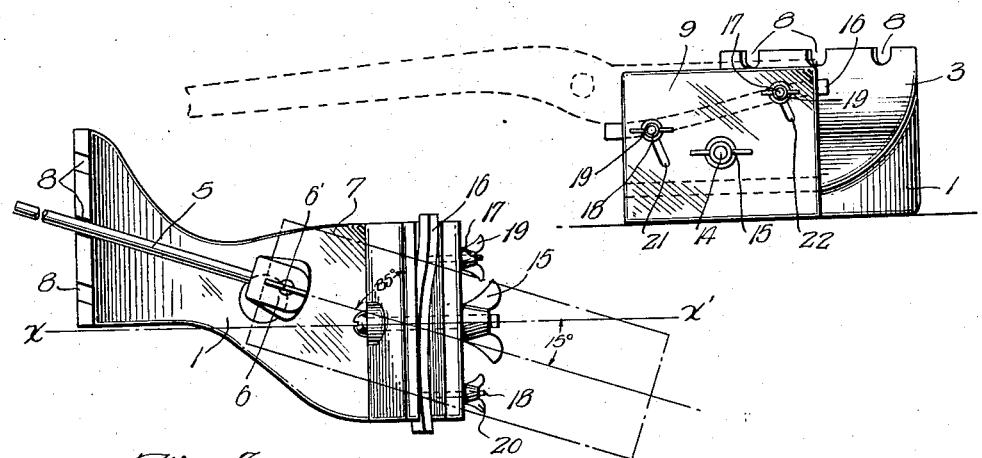
Fig. 2.
Fig. 3.
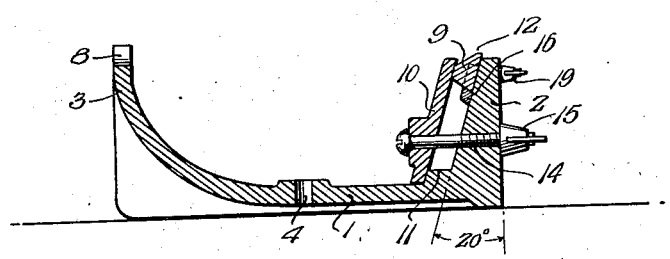
Fig. 4.
INVENTOR
John R. Everhart.
BY
ATTORNEYS Patented Oct. 18, 1932

1,883,658

UNITED STATES PATENT OFFICE

JOHN R. EVERHART, OF WESTMINSTER, MARYLAND

SHEARS SHARPENER

Application filed April 18, 1931. Serial No. 531,214.

My invention relates to improvements in sharpening devices, and more particularly to a sharpener for shears used for the cutting of heavy metallic materials such as tin, sheet iron and metals of like gauges.

An object of my invention is to provide a shears sharpener having means for producing a uniform accurate cutting edge on a shears blade of the heavier and more substantially designed type.

Another object of my invention is to provide a shears sharpener for producing a uniform cutting edge on a shears blade of manganese steel or similarly hard materials.

Yet another object of my invention is to provide a sharpener for the abrasion of the cutting edge of a shears blade to an angle of approximately 70°, which angle has been found to be the most effective for metal cutting shears.

A further object of my invention is to provide a sharpener of sufficiently substantial construction to support the shears blade when subjected to the pressure necessarily placed upon the abrading element to cut to a sharp edge the material used in the blades of metal cutting shears.

Still a further object of my invention is to provide a sharpener for abrading an accurate and smooth cutting edge on a shears blade, even though the blade be constructed of the hardest steel, without changing or reducing the temper of the steel, as is usual with high speed abrasive methods.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

In the drawing like numerals refer to similar parts throughout the several views, of which Figure 1 is a side elevation of the assembled device;

Fig. 2 is an end elevation of Fig. 1 illustrating the manner in which the shears blade is supported;

Fig. 3 is a plan view of the assembled device; and

Fig. 4 is a longitudinal section of the device.

Referring to the drawing and particularly to Figure 1 thereof, the frame 1, is formed at one end with a vise or clamp member 2 and at the other end of the frame there is a file guide portion 3, the frame being further provided with an aperture 4 for the purpose of securing the device to a table or work bench.

A rod 5 is adapted at one end, by means of a clamp 6 and screw 6' to rigidly hold an abrading member 7. The abrading member may consist of material such as carborundum, emery or the like, or a heavy file.

A plurality of slots 8, formed in the guide portion 3, as shown in Figs. 2 and 3 respectively, serve as guide rests for the rod 5 and provide for the reciprocating movement of the abrading member 7, across the shears blade to be sharpened, 9.

The angular design of the slots 8, in conjunction with the curvature of the base of the frame 1, as shown in Fig. 3, provides for the reciprocation of the brading member 7 at an angle of approximately 15° with the normal axis of the device as shown along the line $x-x'$.

The shears blade 9, as shown in Figs. 2 and 4, is constructed of heavy and very hard steel, and is held rigidly in the proper position for sharpening, between the clamping portion of the frame 2 and the complementary vise member 10, by means of the bolt 14 and wing nut 15. The complementary clamp member 10, abutting the offset portion 11 of the clamping member 2, at an angle of 20°, firmly supports the shears blade at the fixed angle of 20°.

The blade to be sharpened is further supported by the curved bracket 16 which is adjustably attached to the inner surface of the fixed portion of the clamping member 2 by means of the screws 17 and 18 and wing nuts 19 and 20 respectively. Two elongated slanting slots 21 and 22 in the clamping portion of the frame 2, through which the screws 17 and 18 pass, provide a means for adjustably securing the curved bracket 16 and thus furnishes a firm support for the lower edge of the blade.

The clamp 2, as shown in Fig. 4, forms an angle of 20° with the perpendicular along its inner surface, and thus in serving as a support for the flat surface of the blade to be sharpened, so supports it that the abrading action of the stone, reciprocating horizontally, produces a cutting edge with an angle of approximately 70°, which cutting angle has been found to be the most effective for metal cutting shears.

The operation of my device is as follows: The shears blade 9 to be sharpened, is placed in the clamping member 2 of the frame. The flat inner surface of the shears blade is placed adjacent to the fixed portion of the clamp member, and the lower edge of the blade is supported by the curved bracket 16 and rigidly held by the bolt 14 and nut 15. After the blade is placed in position, the abrading element 7 is drawn across the edge of the shears blade to be sharpened, and due to the fixed slanting position of the blade, a cutting edge of approximately 70° is produced.

My device is simply constructed, cheap to manufacture and easily operated. It is designed to adequately perform with superior effectiveness its required function of abrading the metal of which cutting shears are constructed, producing a sharp and accurate cutting edge of the most effective angle while at the same time not in any measure destroying the effectiveness or value of the shears blade metal by interfering with its tempered hardness.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

What I claim is:

1. In a sharpening device of the type adapted for the sharpening of heavy duty metal cutting shears, the improvement which consists of a U shaped support having an elongated base and upstanding ends offset with respect to each other, of clamping means associated with one of said ends and comprising a clamping plate and securing means therefor, and a curved blade support, positioned laterally intermediate the said end and associated clamping plate and adjustably secured by means of two separate securing members extending through two elongated curved slots in the said support.

2. In a sharpening device, a frame, a plurality of slots formed in one end of the frame, a rod adapted to reciprocate in said slots and an abrasive element attached to one end of said rod, a clamping member substantially comprising a clamping plate and an upright end support, formed at the other end of the frame, a support bracket substantially conforming to the shape of the member of the article to be sharpened, positioned intermediate the end support and the clamping plate, said end support provided with a pair of elongated slots and said bracket adjustably held in position by bolts extending through the slots.

In testimony whereof I affix my signature.

JOHN R. EVERHART.